United States Patent
Kawese et al.

(10) Patent No.: US 10,803,727 B2
(45) Date of Patent: Oct. 13, 2020

(54) PRODUCTION DEVICE ON-LINE MAINTENANCE SYSTEM AND METHOD

(71) Applicant: MASDAC CO., LTD., Tokorozawa-shi, Saitama (JP)

(72) Inventors: Teruo Kawese, Tokorozawa (JP); Yasuhiro Hashimoto, Tokorozawa (JP)

(73) Assignee: MASDAC CO., LTD., Tokorozawa-shi, Saitama (JP)

( * ) Notice: Subject to any disclaimer, the term of this patent is extended or adjusted under 35 U.S.C. 154(b) by 0 days.

(21) Appl. No.: 16/486,735

(22) PCT Filed: Feb. 13, 2018

(86) PCT No.: PCT/JP2018/004937
§ 371 (c)(1),
(2) Date: Aug. 16, 2019

(87) PCT Pub. No.: WO2018/151112
PCT Pub. Date: Aug. 23, 2018

(65) Prior Publication Data
US 2019/0378394 A1    Dec. 12, 2019

(30) Foreign Application Priority Data

Feb. 17, 2017 (JP) ................. 2017-028433

(51) Int. Cl.
*G08B 21/18* (2006.01)
*H04L 12/66* (2006.01)
(Continued)

(52) U.S. Cl.
CPC .......... *G08B 21/187* (2013.01); *H04L 12/66* (2013.01); *H04L 51/22* (2013.01); *H04L 51/24* (2013.01); *H04Q 9/02* (2013.01); *H04Q 2209/10* (2013.01)

(58) Field of Classification Search
None
See application file for complete search history.

(56) References Cited

U.S. PATENT DOCUMENTS 6,556,950 B1 *   4/2003   Schwenke .............. G05B 17/02
                                                        700/83
2002/0163427 A1 * 11/2002   Eryurek ............... G05B 23/027
                                                        340/500

(Continued)

*Primary Examiner* — Thomas S McCormack
(74) *Attorney, Agent, or Firm* — Greer, Burns & Crain, Ltd.

(57) ABSTRACT

A system for online maintenance of a manufacturing apparatus, for shortening manufacturing apparatus maintenance time, including a user's data accumulator sorting information from the manufacturing apparatus into normal apparatus-management information and urgency information that is promptly sent by email to a maintenance apparatus and to relevant terminals. The system includes (1) a production line including a gateway, a manufacturing apparatus, and a data accumulator, the latter two connected to the gateway; and (2) a maintenance apparatus including a gateway server, a server, and a diagnostic device, the latter two connected to the gateway server. The data accumulator includes a data-gathering unit for accumulating manufacturing apparatus operation data, and a data-evaluation unit for determining whether there is an urgency regarding the accumulated data. If the data-evaluation unit determines that the operation data shows an abnormality and that there is an urgency, it sends an urgency-information email message to the mail server.

4 Claims, 6 Drawing Sheets

(51) Int. Cl.
*H04L 12/58* (2006.01)
*H04Q 9/02* (2006.01)

(56) References Cited

U.S. PATENT DOCUMENTS

| | | | |
|---|---|---|---|
| 2006/0064291 A1* | 3/2006 | Pattipatti | G05B 23/0251 703/14 |
| 2016/0012707 A1* | 1/2016 | McKinley | G08B 21/187 340/679 |

* cited by examiner

PRODUCTION DEVICE ON-LINE MAINTENANCE SYSTEM AND METHOD

TECHNICAL FIELD

The present invention relates to a system and method for online maintenance of a manufacturing apparatus. In particular, the invention relates to a system and method for online maintenance of a manufacturing apparatus that enables the maintenance time for the manufacturing apparatus to be shortened such that a user's data accumulator sorts information from the manufacturing apparatus into normal apparatus-management information and urgency information that indicates an urgency in the manufacturing apparatus, in response to which an email message that includes the urgency information is sent to a maintenance apparatus and to relevant parties' terminals, which causes the manufacturing apparatus to be automatically repaired.

BACKGROUND

If an abnormality occurs in a manufacturing apparatus or production line in which a large amount of products are continuously processed, and the manufacturing apparatus or the production line does not operate normally, imperfect products are produced, and if the apparatus or line is not repaired quickly, a large amount of defective products will be produced. When an abnormality occurs and the production line is shut down, a large number of defective products, which must be disposed of, are produced, and the quantity of the products produced is reduced because of the shutdown. This results in immediate stock shortages, for example in foodstuff that has a short life cycle from manufacture to sale, which leads to loss of sales opportunities and loss of credit due to stock shortages, bringing about huge losses of profits. As a precaution against stockouts, and in order to prevent the loss of credit, manufacturers tend to be forced to manufacture extra products. Also, if products that have a short shelf life, such as foods, are in excess stock, the unsold products must be discarded, which results in waste of resources.

When a production line experiences an obvious abnormality, such as a complete stoppage of production, the person in charge of the production line immediately becomes aware of the trouble and can deal with it properly. However, if there occurs an abnormality, such as a failure inside a manufacturing apparatus, that is not immediately apparent, the person in charge might not become aware of the failure for some time, which might result in a large amount of defective products being produced. Also, it is possible that the defective products will be shipped without the defect being detected, which is particularly problematic in the case of foods, because consumers are becoming increasingly aware of food safety and security, which is a serious, risky situation that cannot be overlooked by manufacturers in the food industry. Therefore, in a manufacturing apparatus and production line that are used, for example, in the food industry, it is extremely important to have, in accordance with the conditions of the manufacturing apparatus, elaborate maintenance measures to prevent the occurrence of abnormalities, to immediately detect any abnormality that occurs, and to promptly notify relevant parties so that the abnormality can be eliminated in a short time.

With respect to maintenance of a manufacturing apparatus, routine and simple maintenance is performed by a person in charge of a user factory in which the manufacturing apparatus is operated. But at maintenance times such as periodic maintenance of the manufacturing apparatus or when major components are replaced, the manufacturer's maintenance personnel perform the maintenance, or a maintenance-company person in charge of maintenance generally visits the user factory to perform the maintenance. However, depending on the conditions of the use of the manufacturing apparatus, the consumption of components might be greater than was expected when the components were designed, which can lead to failure of the components before the time for periodic maintenance. Accordingly, in order to prevent the occurrence of abnormalities in a manufacturing apparatus, it is important to frequently monitor the state of the components of the manufacturing apparatus during actual operating conditions. Also, if an abnormality occurs, it is necessary to first inform the person in charge of the user factory and others concerned about the occurrence of the abnormality. If an abnormality is detected, the person in charge of the user factory is pressed to deal with the abnormality, with the result that he/she might be late in informing other relevant parties about the abnormality.

With this background, there have been proposed various methods and systems, including cloud storing of information concerning a manufacturing apparatus, online sharing information among the parties relevant to the information, and a system of monitoring devices or detecting abnormalities thereof by using a communications network such as the Internet to collect information regarding the operating conditions of various types of devices. Patent Document 1 discloses an apparatus-monitoring system in which data collected from each of multiple devices is sent to a monitoring service center by using a communication network, after which the monitoring service center analyzes the data based on the specific condition(s) registered concerning each device and then sends the analysis results to a specified website. If an abnormality is detected, the information regarding the abnormality is sent to predetermined destinations. Patent Document 2 discloses a remote maintenance system that receives, via a communications network, operational data concerning a customer's device to which maintenance is to be provided, predicts the remaining lifetime of each of the device's components, informs the customer about the predicted lifetime, and displays the result on the customer's terminals along with information concerning each component, by which the customer determines whether the component is to be replaced.

In both of the above techniques, a monitoring device collects data to be monitored via a communications network, and after the monitoring device analyzes the collected data, the monitoring device sends the results of the analysis to relevant parties. However, in those techniques occur delays occur in issuing a notification of an abnormality, and defective products are manufactured during such periods of delay.

PRIOR-ART DOCUMENTS

Patent Documents

Patent Document 1: Japanese Unexamined Patent Application Publication No. 2007-116586. Patent Document 2: Japanese Unexamined Patent Application Publication No. 2003-044126.

SUMMARY

Technical Problem to be Overcome

There is thus a need for a system that (1) frequently monitors the state of components of a manufacturing apparatus during the actual operation of the apparatus, so as to detect in advance and prevent any abnormality therein, and (2) then promptly notifies the parties concerned if an abnormality occurs in a component. The present invention (1) intends to overcome the disadvantages involved in a conventional online maintenance system for manufacturing apparatuses, and (2) aims to provide a system and method for online maintenance of a manufacturing apparatus that (a) enables the maintenance time for the manufacturing apparatus to be shortened such that a user's data accumulator promptly sorts information from the manufacturing apparatus into normal apparatus-management information and urgency information that suggests high urgency in the manufacturing apparatus, and (b) sends an email message regarding the urgency information to the maintenance apparatus and to the terminals of relevant parties, so that in response to the email, the manufacturing apparatus is automatically repaired.

Solution to the Problem

To achieve the above objective, the present invention provides a system for online maintenance of a manufacturing apparatus, with said system having the following features: it includes a user's production line, a maintenance apparatus, a support terminal, and a user's terminal, each being connected to each other via a network. The user's production line includes a gateway, a manufacturing apparatus, and a data accumulator, the latter two being connected to the gateway. The maintenance apparatus includes a gateway server, a server, and a diagnostic device, the latter two being connected to the gateway server. The diagnostic device includes a remedy means for eliminating abnormalities. The data accumulator includes (1) a data-gathering unit for accumulating operation data concerning the manufacturing apparatus, and (2) a data-evaluation unit for determining whether there is an urgency with regard to accumulated data. The server further includes a mail server and a database. If the data-evaluation unit determines that the operation data includes data showing an abnormality and that there is an urgency, the unit sends an urgency-information email message to the mail server. But if the data-evaluation unit determines that there is no urgency with regard to the operation data, the unit batch-processes the operation data to send the processed data to the mail server, which sends the received urgency-information message to the diagnostic device, to the support terminal, and to the user's terminal. The database stores the batch-processed operation data and the results of the diagnosis performed by the diagnostic device based on the operation data. The diagnostic device further includes an urgency-processing unit and a data-diagnosis unit. If the urgency-processing unit receives an urgency-information email message, the urgency-processing unit acquires from the manufacturing apparatus the operation data relating to the urgency-information email message, and diagnoses the operation data. If the urgency-processing unit confirms that there is an abnormality in the data, the urgency-processing unit determines whether the abnormality can be eliminated automatically, and if the urgency-processing unit determines that the abnormality can be eliminated automatically, the urgency-processing unit sends to the manufacturing apparatus the information required for eliminating the abnormality, and continues to acquire operation data concerning the manufacturing apparatus. When the urgency-processing unit confirms that the abnormality has been eliminated and that the operation data has returned to normal, the urgency-processing unit sends a remedy-complete notification email message to the support terminal and to the user's terminal. If the urgency-processing unit determines that the abnormality cannot be eliminated automatically, the urgency-processing unit sends to the support terminal and to the user's terminal a notification email message stating that the abnormality cannot be eliminated. The data-diagnosis unit acquires the operation data from the database of the server so as to diagnose the manufacturing apparatus, and outputs the diagnostic results to the database of the server, where the results are stored.

It is preferred that the support terminal further includes a remote-control unit, with which is accessed a control unit included in the manufacturing apparatus. If an abnormality is identified, control information is diagnosed remotely, and the abnormality is eliminated remotely when the support terminal unit receives a notification email message stating that the abnormality cannot automatically be eliminated. It is also preferred that the operation data includes at least any piece of information from among (1) operating information that represents the operating status of the manufacturing apparatus, (2) component-consumption information that indicates the degree of consumption of components, (3) abnormality information that indicates any abnormality of the manufacturing apparatus, and (4) symptom(s) information that indicates any symptom(s) that suggest that the manufacturing apparatus could experience an operating problem. If the operation data includes data relating to component-consumption information, the diagnostic device adds component-life-prediction information to the diagnostic results, based on both the component-consumption information and reference information concerning the component that relates to the consumption information.

To achieve the above objective, the present invention provides a method for online maintenance of a manufacturing apparatus, with said method including the following steps: (1) accumulating, in a data accumulator that is connected to the user's manufacturing apparatus, operation data concerning the manufacturing apparatus; (2) determining, by the data accumulator, whether there is an urgency with regard to the operation data concerning the manufacturing apparatus according to the content of the operation data concerning the manufacturing apparatus; (3) sending, by the data accumulator, an urgency-information email message to a mail server included in a server that is included in the maintenance apparatus, if the data accumulator determines that there is an urgency with regard to the operation data; (4) sending, by the mail server, the received urgency-information email message to the diagnostic device, which includes a remedy means for eliminating an abnormality, to a support terminal, and to a user's terminal; (5) acquisition from the user's manufacturing apparatus, by the diagnostic device that has received the urgency-information email message, the operation data relating to the urgency-information email message; (6) diagnosis by the diagnostic device of the operation data; and (7) if the diagnostic device has confirmed that the operation data includes data showing an abnormality, determining by the diagnostic device whether the abnormality can be eliminated. The steps by the diagnostic device further include: (1) if the diagnostic device determines that the abnormality can be automatically eliminated, sending to the manufacturing apparatus the information required to eliminate the abnormality; (2) continuously acquiring the operation data concerning the manufacturing apparatus; (3) if the diagnostic device confirms that the abnormality has been eliminated and that the operation data has returned to normal, sending a remedy-complete notification email message to the support terminal and to the user's terminal. The method further includes the following steps: (1) if the diagnostic device determines that the abnormality cannot be eliminated automatically, sending, by the diagnostic device to the support terminal and to the user's terminal, a notification email message informing that the abnormality cannot be eliminated; and (2) if the data accumulator determines that the operation data does not contain any data that shows abnormality and that there is no urgency with regard to the operation data, by the data accumulator batch-processing the operation data and sending the processed data to the server.

Advantageous Effects of the Invention

The system for online maintenance of a manufacturing apparatus according to the present invention is configured such that normal administrative information that relates to data that is determined to be in a normal operating state among the operation data of a manufacturing apparatus is sent to a server, and urgency information relating to data that is determined to show an urgency among the operation data is promptly sent by an email message to a diagnostic device and to the terminals of relevant parties, whereby relevant parties are quickly informed about the occurrence of an abnormality so that they can swiftly deal with the abnormality. Also, the system for online maintenance of a manufacturing apparatus according to the present invention is configured such that the diagnostic device that has received the urgency-information email message diagnoses the content of the abnormality and determines how to deal with the abnormality. If the diagnostic device determines that the abnormality can be eliminated, it sends to the manufacturing apparatus the information required for eliminating the abnormality along with an instruction to eliminate the abnormality. If the diagnostic device determines that it is impossible to automatically eliminate the abnormality, it informs the terminals of the relevant parties accordingly. Thus, the present system, by providing, in an urgent situation, measures that lighten the burden of the person who is in charge of a production line when he/she encounters an abnormality in a manufacturing apparatus, and who considers various factors, including damage to the manufacturing apparatus, effects on a product, the impact on consumers, and the manufacturer's social responsibility, so that he/she can take proper and speedy steps for overcoming the abnormality, and thereby the system supports that person in that urgent situation.

Further, the online maintenance of a manufacturing apparatus system according to the present invention can output component-life-prediction information concerning a component based on the operation data concerning the manufacturing apparatus, so that the system properly indicates the time for replacement of a component whose lifetime has become shorter than expected due to the state of the manufacturing apparatus of the component, which also helps prevent the occurrence of abnormalities.

DETAILED DESCRIPTION

Figure 1:
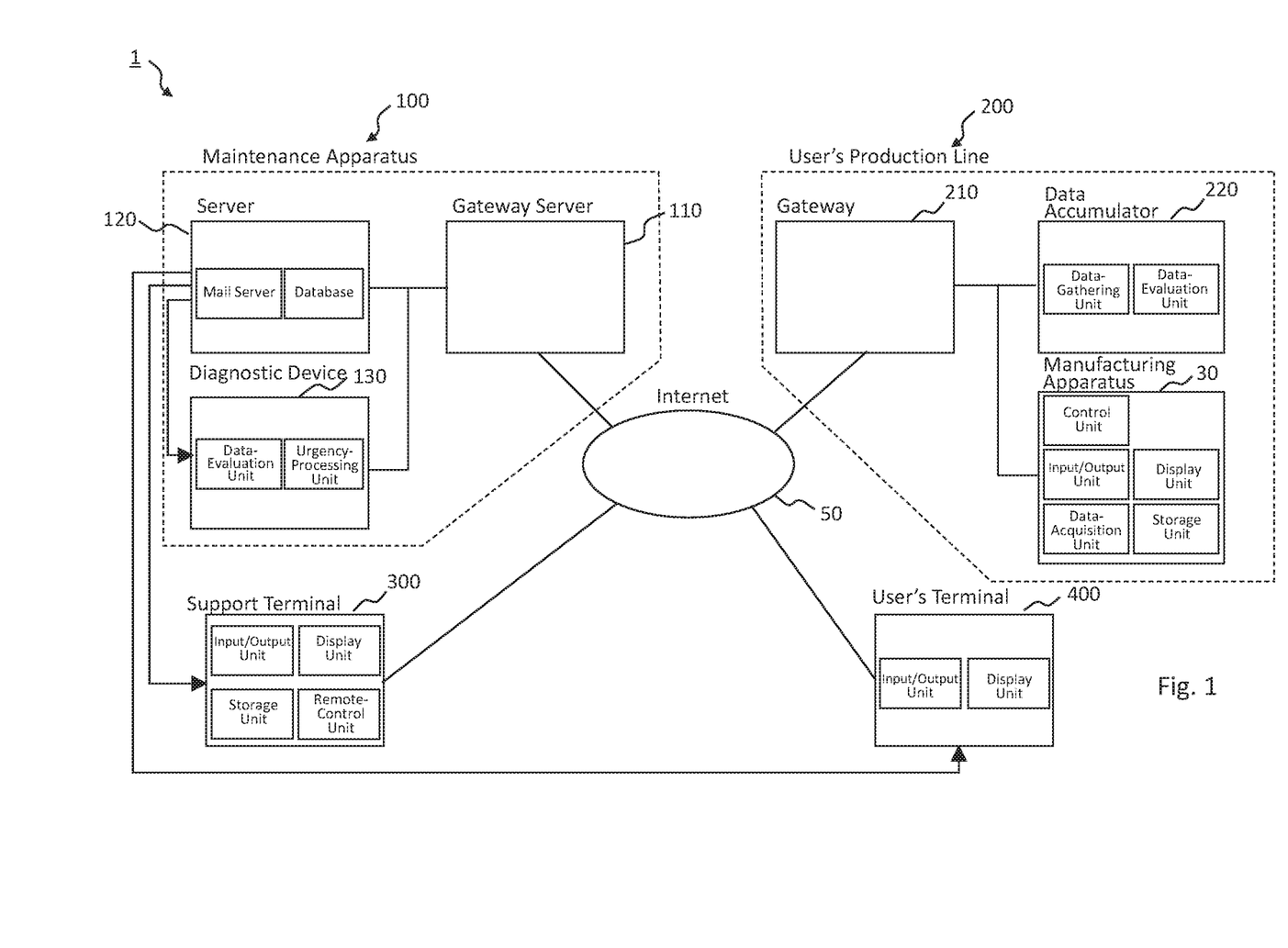
FIG. 1 is a block diagram that schematically shows the configuration of a system for online maintenance of a manufacturing apparatus according to an embodiment of the present invention.

Next, specific examples for embodying a system for online maintenance of a manufacturing apparatus system according to the present invention will be described in detail with reference to the drawings. FIG. 1 is a block diagram that schematically shows the configuration of the online maintenance system according to the present invention.

Referring to FIG. 1, System 1 for online maintenance of a manufacturing apparatus according to an exemplary embodiment of the present invention includes a maintenance apparatus 100, a user's production line 200, a support terminal 300, and a user's terminal 400, each being connected to each other via a network 50 as follows. The maintenance apparatus 100 includes a gateway server 110 that is connected to the network 50, a server 120 that is connected to the gateway server 110, and a diagnostic device 130. The user's production line 200 includes a gateway 210 that is connected to the network 50, to a data accumulator 220, and to a manufacturing apparatus 230.

System 1 for online maintenance of a manufacturing apparatus is configured to perform the following procedures, which provide for accurate and prompt maintenance of the manufacturing apparatus: (1) the data accumulator 220 gathers operation data concerning a manufacturing apparatus in the user's production line; (2) if the data accumulator 220 determines that the operation data includes data that shows an abnormality and that there is an urgency, the data accumulator 220 sends—to a user's terminal 400 that is operated by a person who manages the production line, and to a support terminal 300 that is managed by a person in charge of maintenance of the manufacturing apparatus—an emergency-information email message informing that there is an abnormality, and also sends to a diagnostic device an urgency-information email message that requests an initial response by the diagnostic device; (3) the diagnostic device acquires and diagnoses the operation data concerning the manufacturing apparatus to determine whether the data includes data showing an abnormality; (4) if the diagnostic device determines that any abnormality in the data can be eliminated by a response of the diagnostic device, the device sends to the manufacturing apparatus the information required for eliminating the abnormality; and (5) if the diagnostic device determines that the abnormality cannot be eliminated by a response of the diagnostic device, it sends to the support terminal 300 and to the user's terminal 400 a notification email message informing them of the need for an early response. Further, because the support terminal 300 is provided with a means for diagnosing and repairing the manufacturing apparatus by remote operation, even if the response of the diagnostic device cannot eliminate the abnormality, System 1 for the online maintenance of the manufacturing apparatus is capable of effecting a more-sophisticated remedy online, which promptly eliminates the abnormalities.

In addition, the operation data gathered in the data accumulator is sent to be stored in a database of the maintenance apparatus, where it is diagnosed by the diagnostic device. The diagnostic results concerning the operation data are stored in the database together with the information concerning the need for maintenance, so that the data can be browsed via the support terminal 300 and the user's terminal 400. Thus, the timing for maintenance of the manufacturing apparatus is made clear, so that the relevant parties are aware of the necessity for proper maintenance of the apparatus so as to prevent abnormalities thereof.

Referring to FIG. 1, the system will be described beginning with the user's production line 200, from which the information concerning the manufacturing apparatus originates. The gateway 210 is a gateway device that is connected to an external network 50 and that, by using protocols such as TCP/IP, connects to the external network 50 the devices communicably connected therebetween inside the user's production line. The network 50 is a wide-area network such as the Internet.

Both the data accumulator 220 and the manufacturing apparatus 230 are connected to the gateway 210, and are configured to communicate with the maintenance apparatus 100 via the gateway 210 and the external network 50. The connections between the gateway 210, the data accumulator 220, and the manufacturing apparatus 230 can be made via a local-area network, a general-purpose serial communication, or the like.

The manufacturing apparatus 230 can be configured in various ways according to the products to be manufactured, but each configuration includes a control unit for controlling the manufacturing apparatus 230, an input/output unit that allows the manufacturing apparatus 230 to communicate with other devices, a storage unit that stores a program to control the manufacturing apparatus 230 and data received thereby from outside devices, and a display unit for displaying the program and data. Further, the manufacturing apparatus 230 includes a data-acquisition unit that includes a sensor for obtaining operation data that represent the operating status of the manufacturing apparatus 230.

The operation data is, for example, the number of operations or the accumulated operating time if the manufacturing apparatus has a motor or an electromagnetic valve, and is the pressure of supplied gas or the output of a gas-detection alarm device if the manufacturing apparatus involves combustion. The operation data is data that relates to parameters that are significantly relevant to the operation of the manufacturing apparatus. The operation data can include data obtained by continuously monitoring the operation of the manufacturing apparatus; for example, the accuracy of the position at which a movable component is to be stopped and/or the vibration condition of a movable part over a long period, by which the timing of maintenance is indicated according to when the obtained data will likely exceed a predetermined threshold.

The data accumulator 220 is communicably connected to the manufacturing apparatus 230, and includes (1) a data-gathering unit that acquires and stores operation data from the data-acquisition unit of the manufacturing apparatus 230, and (2) a data-evaluation unit that determines whether, based on predetermined judgment criteria, there is an abnormality in the operation data that is stored in the data-gathering unit.

FIG. 1 shows only one data accumulator 220 and only one manufacturing apparatus 230 in the user's production line are, but multiple manufacturing apparatuses 230 can be included in a production line. If multiple manufacturing apparatuses 230 are provided, multiple data accumulators 220 corresponding to the multiple manufacturing apparatuses 230 can be provided, or the operation data obtained from the multiple manufacturing apparatuses 230 can be gathered and stored in one data accumulator 220. In the latter case, the data-gathering unit stores the operation data such that the manufacturing apparatus 230 from which the operation data has been obtained from is identifiable. Also, if the operation data concerning the manufacturing apparatus 230 includes data from multiple sensors, or data relating to multiple data objects, the data-gathering unit stores the operation data such that the data object that the data relates to, or the sensor from which the data originates, is identifiable. Such data identification can be achieved by assigning a header for identification to each unit of operation data. In order to record the history of the operation data, the time at which the operation data has been obtained is also stored by associating the time with each unit of relevant data.

The data-gathering unit can acquire the operational data from the manufacturing apparatus 230 in real time or at predetermined intervals. The timing of the acquisition of the operation data can be changed according to the data object. The data can be acquired in accordance with the timing of events such as when the main power supply of the manufacturing apparatus 230 is turned on, or when a specified movable part starts to move.

The operation data that the data-gathering unit acquires concerning the manufacturing apparatus 230 is classified into the following categories according to the content of the data: operating information, which represents the operating status of the manufacturing apparatus; consumption information, which indicates the extent of consumption of components; abnormality information, which indicates any abnormality of the manufacturing apparatus; and symptom information, which indicates that the manufacturing apparatus might experience an abnormality. The operation data contains at least one type of the above types of information. For example, if the manufacturing apparatus 230 includes a component having a design life of x hours, the time during which the manufacturing apparatus is operating normally is a piece of operation information, so that the data relating to the operation information is tracked so as to calculate the accumulated operation time y. The difference between the accumulated operation time y and the design life x is the time remaining before the component is to be replaced, which is component-life-prediction information, and therefore the accumulated operation time is a piece of consumption information regarding the design life x. Similarly, the consumption information for a component such as an electromagnetic valve whose service life is determined from the number of operations, or whose design life is x operations, is obtained in such a manner that the actual number of operations is calculated to determine the accumulated number of operations y.

Components having a predetermined life span are incorporated into the manufacturing apparatus on the assumption that the use conditions thereof will be standard, but the replacement time for each component varies depending on the operating status of the manufacturing apparatus, and therefore replacement times cannot be determined uniformly. Because a production line is generally provided with many manufacturing apparatuses and each manufacturing apparatus includes many components, it is not easy to accurately know the replacement time for each component. Therefore, providing a data accumulator for tracking the operating status of the manufacturing apparatus is a very effective means for preventing the occurrence of an abnormality, and is meaningful from the viewpoint of preventive maintenance.

Unlike consumption information for estimating the replacement time, the symptom information of the operation data is data used to foresee future failures of components, such as data relating to trend management, which tracks the trend of a condition that would cause trouble in the future if left unchecked. The data refers to such conditions as situations, for example, where the target place at which a component having a movable part is to be stopped is gradually displaced while the component has been used for many years, or where the vibration of a rotating part gradually increases. Such symptom information indicates the appropriate timing for maintenance before a failure occurs. The continuous gathering of symptom information helps prevent troubles that are not easy to recognize in advance.

The data-evaluation unit analyzes the accumulated operation data that is received and stored by the data-gathering unit to determine whether the data suggests any urgency. Urgency is determined by, for example, whether the data relating to a data object predetermined as important, which is determined by whether the data relates to a stopping the production line, suggests that the condition represented by the data is likely to reach a preset condition. For example, in the gas-detection alarm device used for a combustion furnace for food manufacturing, urgency is the condition where a signal that indicates that gas leakage has been detected is to be issued. Also, in the pressure sensor relating to supply gas, urgency is determined according to whether the output value of the sensor has deviated from a predetermined threshold.

If the data-evaluation unit determines that the operation data includes data that shows an abnormality and that there is an urgency, the data-evaluation unit sends an urgency-information email message to a mail server included in the server 120 of the maintenance apparatus 100 informing the mail server of the occurrence of the abnormality. The urgency-information email message is sent to each manufacturing apparatus 230 and/or to destinations included in a preset destination list, which is preset according to each data object that is predetermined as important. Included in such destinations are at least the destination of the diagnostic device 130 of the maintenance apparatus 100, the support terminal 300 for a person in charge of maintenance, and the user's terminal 400 for a person in charge of the production line of a user factory in the manufacturing apparatus 230 where an abnormality is identified. In contrast, if the data-evaluation unit determines that the operation data does not contain any data that shows abnormality and that there is no urgency, the data-evaluation unit batch-processes the operation data, and sends the processed data to the server 120 of the maintenance apparatus 100.

The gateway server 110 of the maintenance apparatus 100 is a gateway device of the maintenance apparatus 100 that is connected to the outside network 50, connecting to the external network 50 by using protocols that the gateway 210 performs—the devices that are communicably connected inside the maintenance apparatus 100.

According to other exemplary embodiments, an environment capable of maintaining high security can be provided between the gateway server 110 and the gateway 210, for example, by setting a VPN thereto for sending and receiving data; or, instead of using a VPN, a communication method can be adopted in which security is maintained by using TLS 1.0 and an encryption method such as AES256.

The server 120 includes (1) a mail server that receives urgency-information email messages from the data accumulator 220 and that sends the email messages to the diagnostic device 130, to the support terminal 300, and to the user's terminal 400, and (2) a database that stores the batch-processed operation data received from the data accumulator 220. In FIG. 1, only one user's production line 200 is connected to the network 50, but multiple user's production lines 200 can be connected thereto. The mail server receives urgency-information email messages relating to each user's production line 200, and sends the received email messages to each destination preset for such urgency-information email messages. Therefore, even if the number of the user's production line 200 connected to the maintenance apparatus 100 is increased, the mail server included in the server 120 of the maintenance apparatus 100 can deal with the email messages relating to each user's production line 200.

The database classifies and stores the operation data from each data accumulator 220 of each user's production line 200 according to each manufacturing apparatus and each data object, the data being aligned historically. Also, the database classifies and stores according to each manufacturing apparatus the diagnostic results of the operating status that has been diagnosed by the diagnostic device. If the server 120 receives a request to browse the operation data and/or the diagnostic results that have been stored in the database, it provides the pieces of information in a state such that they can be browsed. In order to do that, for example, each dedicated page (my-page) for the support terminal 300 and the user's terminal 400 are created at the initial registration of each terminal on the server 120, so that the server 120 displays the data requested by each terminal on the terminal's my-page.

The diagnostic device 130 includes (1) an urgency-processing unit that deals with any urgency-information email message(s) that it receives, and (2) a data-diagnosis unit that diagnoses the operating status by using the operation data when the data-evaluation unit determines that there is no urgency concerning operation data. If the urgency-processing unit receives an urgency-information email message, it acquires from the manufacturing apparatus 230 the operation data relating to that message, and diagnoses the operation data. If the urgency-processing unit confirms that there is an abnormality in the data, the emergency-processing unit determines whether the abnormality can be eliminated. If the emergency-processing unit determines that the abnormality can be eliminated, it sends to the manufacturing apparatus 230 the information required to remedy the abnormality. If the emergency-processing unit determines that the abnormality cannot be eliminated, it sends to the support terminal 300 and to the user's terminal 400 a notification email message stating that the abnormality cannot be eliminated.

If the urgency-processing unit receives an urgency-information email message from the data accumulator 220, it directly accesses the manufacturing apparatus 230 to acquire the operation data through the data accumulator 220. The urgency-processing unit is provided with judgement criteria that are the same as those provided to the data accumulator 220, and the unit diagnoses the operation data acquired from the manufacturing apparatus 230 to confirm the content of the abnormality. The urgency-processing unit further includes a countermeasure means for coping with previously expected abnormalities, by which the unit determines whether a confirmed abnormality is dealt with by the countermeasure means and the abnormality can be eliminated. If the emergency-processing unit determines that the abnormality can be eliminated, the abnormality is eliminated by using the countermeasure means. The countermeasure means can be, for example, a program that instructs resetting or automatically aligning the movable part of the manufacturing apparatus 230, or a command that is provided to a component relating to the abnormality. The urgency-processing unit eliminates the abnormality by sending to the manufacturing apparatus 230 such remedy-related information.

The urgency-processing unit can be configured such that it continues to acquire operation data relating to the manufacturing apparatus 230, and when it confirms that the abnormality has been eliminated and the operation data has returned to normal, it sends to the support terminal 300 and to the user's terminal 400 a remedy-complete notification email message. Such information concerning the abnormality and the elimination of the abnormality can be stored as a maintenance record to help improve the accuracy of detection of abnormalities and to improve the remedy means. The accumulation of such maintenance records can improve the accuracy of the automatic remedy performed by the emergency-processing unit and can expand the scope of the abnormalities that the urgency-processing unit can deal with, for example, by combining the records with an artificial intelligence (AI) function.

The data-diagnosis unit acquires the operational data concerning the manufacturing apparatus 230 that has been sent from the data accumulator 220 and stored in the database, diagnoses the manufacturing apparatus 230, and outputs diagnostic results including the diagnosis of the operating status of the manufacturing apparatus, and the expected maintenance time. The data-diagnosis unit diagnoses, among the operation data concerning the manufacturing apparatus 230, data classified into the operation information, consumption information, and symptom(s) information. The data-diagnosis unit stores as reference information component-design-life information for each component to be diagnosed. If the operation data contains data relating to consumption information, the data-diagnosis unit can estimate the replacement time for each component that is equivalent to the component-life-prediction information based on the reference information of each component corresponding to the data relating to the consumption information, and the lapsed time for the data relating to the consumption information. The information of this estimated replacement time can be included in the diagnostic results.

The data-diagnosis unit can store for each data object to be tracked thresholds relating to the components to be diagnosed, can estimate the next time for maintenance based on the symptom information, and can include in the diagnostic results the time for maintenance. For example, the data-diagnosis unit stores the threshold for the target place at which a component having a movable part is to be stopped, and determines the tendency of the deviation of that target stopping place of the component from the time-series change regarding symptom information. Thus, the data-diagnosis unit estimates the time when the deviation would exceed the threshold, and includes in the diagnostic results the estimated time as the next maintenance time, whereby the unit can provide to the maintenance person an appropriate time for maintenance.

The diagnostic device 130 can be configured such that it periodically collects diagnostic results and abnormality-elimination records, and sends summary reports of the results and records to the support terminal 300 and to the user's terminal 400. In particular, if it is found as a result of the diagnosis that the estimated time of maintenance is earlier than the time that is normally estimated, the diagnostic device 130 can in each case send to the support terminal 300 and to the user's terminal 400 an email message or a report stating that maintenance is required.

The support terminal 300 includes (1) an input/output unit that receives urgency-information email messages, (2) a display unit that displays the content of email messages, (3) a remote-control unit with which the control unit of the manufacturing apparatus in which an abnormality has been detected is accessed, control information is diagnosed, and the abnormality is eliminated remotely when the support terminal unit 300 receives from the diagnostic device 130 a notification email message that the abnormality cannot be eliminated. In addition to the countermeasure means to a previously expected abnormality, which is provided to the diagnostic device 130, the abnormality of the manufacturing apparatus 230 also can be eliminated by a more-advanced countermeasure means, or by a customized countermeasure means in response to the specific aspects of abnormalities, the countermeasure means having previously been stored in, or additionally inputted into the remote control unit. For example, an optimum control parameter or a patch program for modifying the control program is sent through the remote-control unit, by checking the feedback value obtained after a control parameter has been changed.

The content of remote control by the support terminal and the results of the control can be sent to the server 120 and stored as part of the maintenance record. The support terminal 300 is embodied by providing, to a personal computer having an input/output unit and a display unit, a remote control means for remotely controlling the manufacturing apparatus 230. The support terminal 400 includes (1) an input/output unit for receiving urgency-information email messages, and (2) a display unit for displaying the content of the email messages. The support terminal 400 sends to the server 120 a request to browse the diagnostic results of the diagnostic device 130 as required, and receives and displays the diagnostic results. The user terminal 400 can be embodied as one of a variety of information-processing devices—such as a personal computer, a tablet terminal, or a smartphone—having input/output means for browsing webpages and for sending/receiving email messages.

Figure 2:
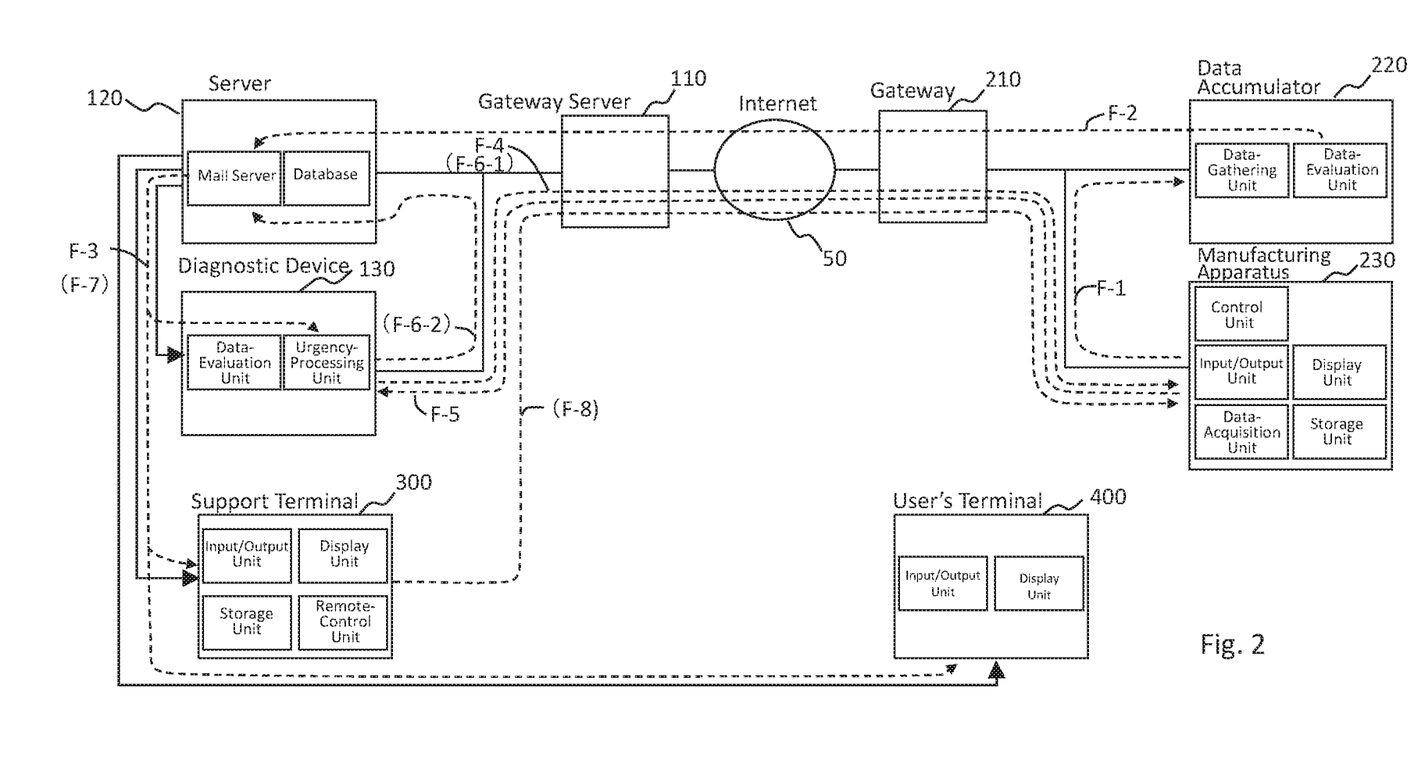
FIG. 2 is a diagram that shows the flow of information according to the embodiment of the present invention when online maintenance of a manufacturing apparatus is needed because the manufacturing apparatus is in a state of an urgency.

FIG. 2 is a diagram that shows the flow of information according to the embodiment of the present invention when the online maintenance of a manufacturing apparatus system is in a state of an urgency. FIG. 2 includes information flows shown by the broken lines F-1 to F-2, which are flows accompanied by the events occurring in the System 1 online maintenance of a manufacturing apparatus.

When operation of the manufacturing apparatus 230 starts, the manufacturing apparatus 230 obtains a variety of operation data that shows the operating status of the manufacturing apparatus 230 through a data-acquisition unit that includes sensors and counters provided to the manufacturing apparatus 230, and outputs the obtained data to the data accumulator 220 (F-1). If the data accumulator 220 is connected to the manufacturing apparatus 230 in a one-to-one relationship, the output of the operational data may be real-time data. If multiple manufacturing apparatuses 230 are connected to one data accumulator 220, measures to prevent the conflict of the operation data to be sent are performed such that the manufacturing apparatus 230 sends an interrupt request, or the data accumulator 220 performs polling.

If the data-evaluation unit determines that the operation data stored in the data-gathering unit includes data showing an abnormality and that there is an urgency, the data-evaluation unit sends an urgency-information email message to the server 120 via the external network 50 (F-2) informing the server about the abnormality. The data-evaluation unit specifies the destinations to which the urgency-information email message is to be sent by referring to the destination list prepared for each manufacturing apparatus, and sends the urgency-information email message to those destinations.

The mail server of the server 120 sends the received urgency-information email message to the designated destinations (F-3). Included in the destinations of the urgency-information email message are at least the destination of the diagnostic device 130, the support terminal 300, and the user's terminal 400. The urgency-information email message sent to the support terminal 300 and to the user's terminal 400 is to promptly inform both the person in charge of the production line of a user factory and the person in charge of maintenance of the occurrence of the abnormality. In contrast, the urgency-information email message sent to the diagnostic device 130 is a request signal requesting remedial action in addition to informing the diagnostic apparatus 130 of the occurrence of the abnormality. When the urgency-processing unit of the diagnostic device 130 receives the urgency-information email message, it directly accesses the manufacturing apparatus 230 relevant to this urgency-information email message via the external network 50 (F-4), and acquires operation data relating to the urgency-information email message (F-5).

Next, the urgency-processing unit diagnoses the acquired operation data, and if it confirms abnormality in the data, it refers to the previously expected countermeasure means, and determines whether the confirmed abnormality can be eliminated. When the emergency-processing unit determines that the abnormality can be eliminated, the unit sends the elimination-related information to the manufacturing apparatus 230 to eliminate the abnormality (F-6-1). When the urgency-processing unit automatically eliminates the abnormality as described above, the unit can be configured to further acquire operation data after the abnormality has been eliminated pursuant to the information flows shown by F-4 and F-5 to confirm that the abnormality has been eliminated. In accordance with the above configuration, the urgency-processing unit can be configured such that the unit sends the remedy-complete notification email message to the support terminal 300 and to the user's terminal 400 (F-7) via the mail server (F-6-2).

If the urgency-processing unit determines that a remedy is not possible, the unit sends, via the mail server of the server 120 (F-6-2), a notification email message to the support terminal 300 and to the user's terminal 400, stating that a remedy is not possible (F-7). When the support terminal 300 receives the remedy-impossible notification email message, the manufacturing apparatus 230 is directly accessed through the remote-control unit via the external network 50 for the abnormality to be eliminated (F-8). In FIG. 2, the broken line F-8 is a one-directional arrow from the support terminal 300 to the manufacturing apparatus 230, but actually the information flow is bidirectional, because the remedy is performed while feedback values obtained from the manufacturing apparatus 230 are checked.

Figure 3:
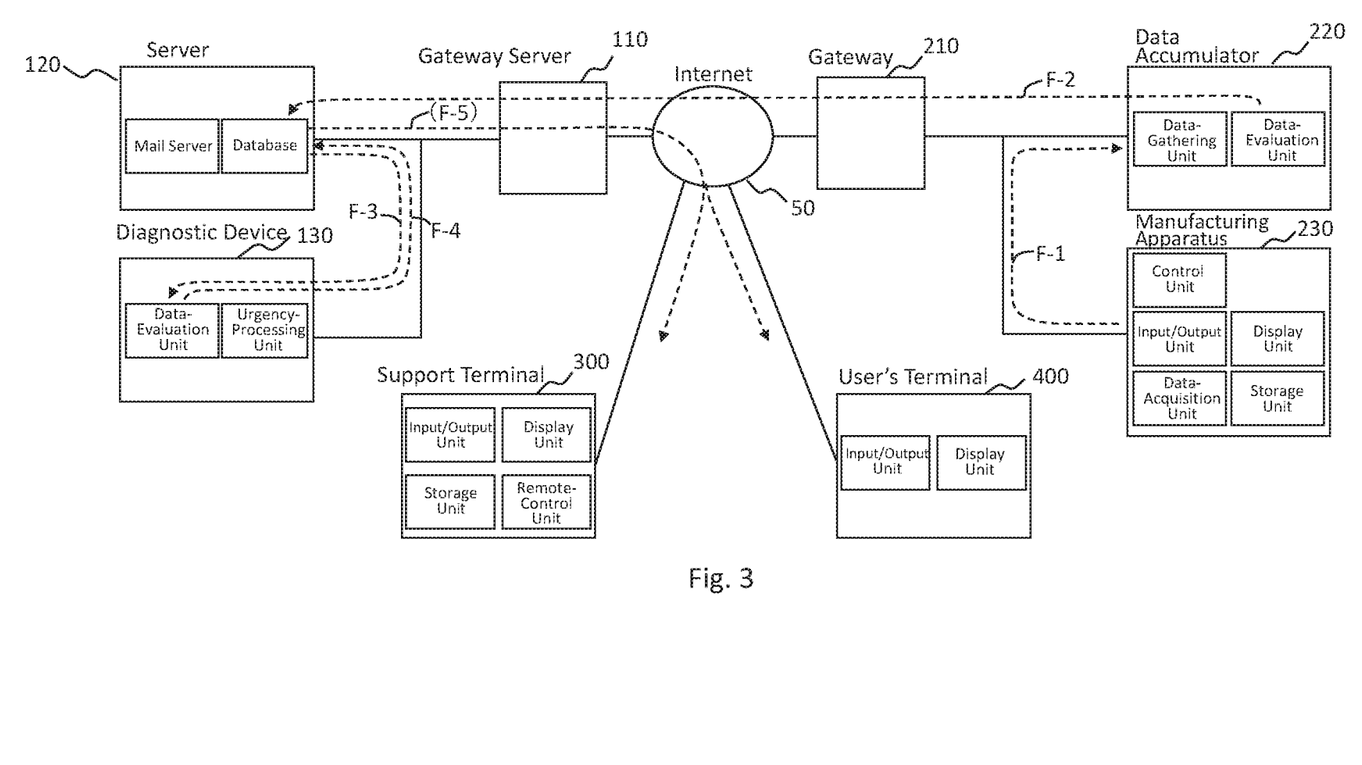
FIG. 3 is a diagram that shows the flow of information according to the embodiment of the present invention when the system for online maintenance of a manufacturing apparatus is in a normal state.

FIG. 3 is a diagram that shows the flow of information according to the embodiment of the present invention when the online maintenance of a manufacturing apparatus system is in an ordinary state. Referring to FIG. 3, the manufacturing apparatus 230 outputs to the data accumulator 220 (F-1) the operation data obtained by the data-acquisition unit with the start of the operation of the manufacturing apparatus. The data-gathering unit of the data accumulator 220 receives the operation data output from the manufacturing apparatus 230, and stores that data such that each manufacturing apparatus and each data object of the operation data can be identified. The data-evaluation unit of the data accumulator 220 determines where there is an urgency according to whether the operation data includes data showing an abnormality. If the data-evaluation unit determines that there is no urgency, the data-evaluation unit batch-processes the operation data, and sends the processed data to the server 120 via the external network (F-2).

The server 120 stores the received operation data in the database. Because there is no urgency in this situation, an urgency-notification email message is not sent to the support terminal 300 or to the user's terminal 400. The diagnostic device 130 acquires the operation data stored in the database of the server 120 at a predetermined time (F-3), and diagnoses the operating status of the manufacturing apparatus 230. The diagnostic result is sent to the server 120 (F-4) and is stored in the database so that the diagnostic result can be identified as to what data object of what manufacturing apparatus the result relates to.

The stored diagnostic results can be browsed via the support terminal 300 and the user's terminal 400. These terminals can designate the manufacturing apparatus and the data object of the operation data, by which the diagnostic results stored in the database are displayed on the terminals to be confirmed. The next time for maintenance according to the operating status of the manufacturing apparatus can be included in the diagnostic results. When a diagnostic result suggests that maintenance is required earlier than initially estimated, the diagnostic device 130 can be configured to send, via the mail server of the server 120 (not shown in FIG. 3), to the support terminal 300 and the user's terminal 400, an email message informing of the need for maintenance.

Figure 4:
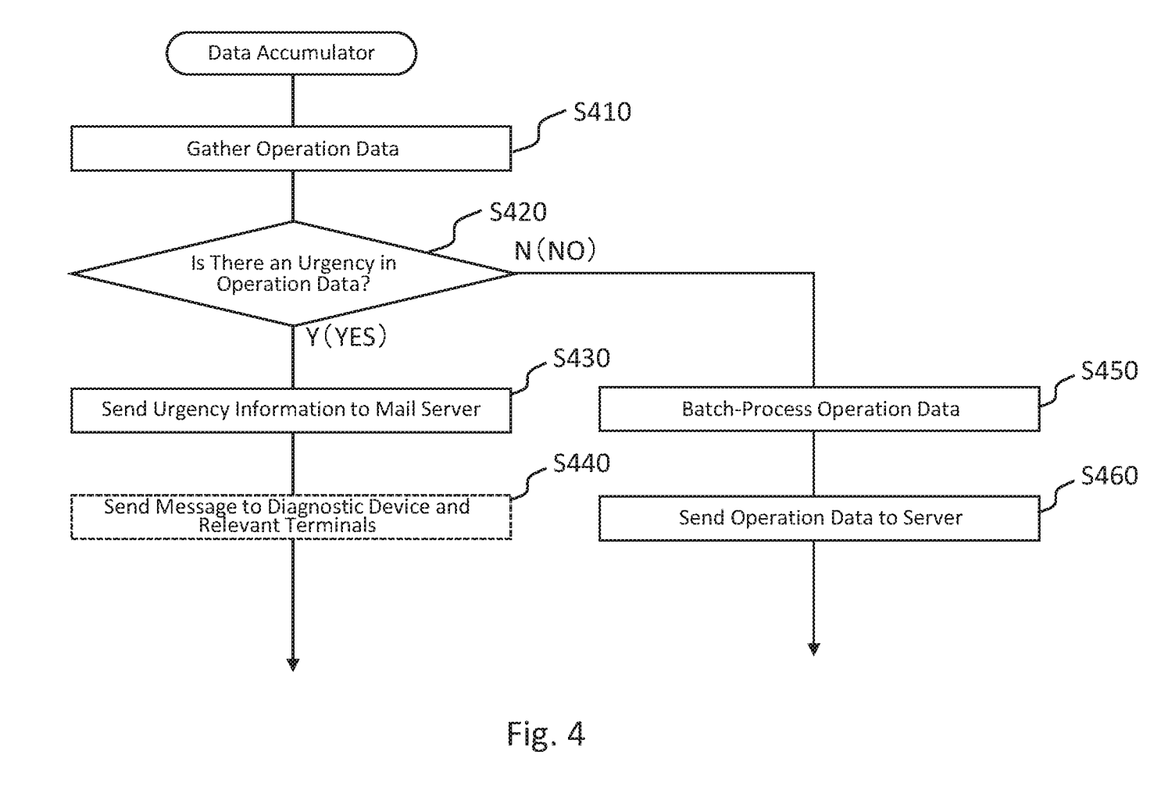
FIG. 4 is a flow chart that shows the processing of the data accumulator according to an embodiment of the present invention.

FIG. 4 is a flow chart that shows the processing of the data accumulator according to the embodiment of the present invention. In S410, the data-gathering unit of the data accumulator 220 accumulates the operation data relating to the manufacturing apparatus 230. If multiple manufacturing apparatuses 230 are connected to the data accumulator 220, the data-gathering unit stores the operation data such that the operation data can be identified as to the manufacturing apparatus from which the operation data has been acquired. Also, if the manufacturing apparatus 230 is provided with a data-acquisition unit that includes multiple sensors and counters, and the operation data includes the data concerning multiple data objects from multiple sensors and counters, the data-gathering unit stores the data such that the data can be identified as to which data object the data relates to.

In S420, the data-evaluation unit of the data accumulator 220 analyzes the stored operation data to determine whether there is an urgency. Whether there is an urgency is determined based on the prescribed condition provided relating to each data object, and on whether the present condition has reached the preset condition, for example, whether the value of data relating to a data object has exceeded a threshold.

When the data-evaluation unit determines that the operation data includes data showing an abnormality and that there is an urgency, it sends, to at least the diagnostic device 130, to the support terminal 300, and to the user's terminal 400, an urgency-information email message stating that an abnormality has occurred in the user's production line 200. If each of the manufacturing apparatuses and/or each of the components of the apparatus is supported by different persons in charge, and multiple support terminals 300 and user's terminals 400 are provided, the data-evaluation unit stores the destination list that includes the destinations of each manufacturing apparatus, each component of the manufacturing apparatus, and the destinations according to each data object. The data-evaluation unit refers to the destination list in view of the manufacturing apparatus and the data object relating to the abnormality to send an urgency-information email message to the relevant destinations. The urgency-information email message is sent to the mail server of the server 120 in S430, and is sent to each destination designated by the data-evaluation unit from the mail server in S440.

The urgency-information email message is not operation data itself that includes data showing an abnormality, but states in what production line, and in what manufacturing apparatus, an abnormality has occurred, and to what data object the abnormality relates. The urgency-information email message can be configured to contain only the fact of the occurrence of an abnormality and a notice urging the recipients to browse their own my-pages, wherein the server 120 separately acquires the details of the abnormality from the data accumulator 220 to display the details of the abnormality on each my-page of the support terminals and each user's terminal. In contrast, if in S420 the data-evaluation unit determines that there is no urgency, it batch-processes the operation data in S450, and sends the processed data to the server 120 so that the data is stored in the database in S460.

Figure 5:
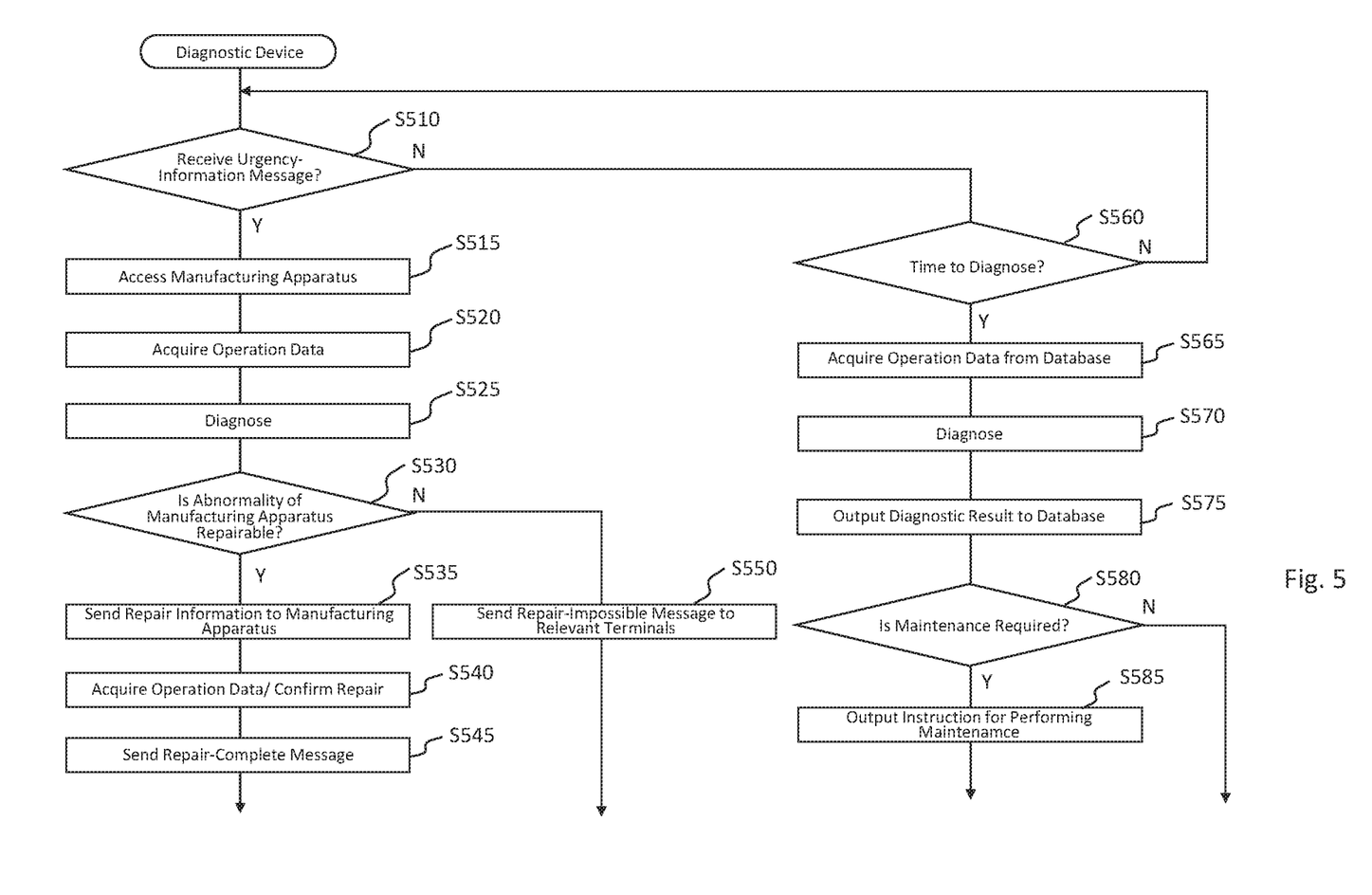
FIG. 5 is a flow chart that shows the processing of the diagnostic device according to an embodiment of the present invention.

FIG. 5 is a flow chart that shows the processing of the diagnostic device according to the embodiment of the present invention. Referring to FIG. 5, in S510 the diagnostic device 130 confirms whether it has received an urgency-information email message. When the diagnostic device 130 has received the urgency-information email message, the urgency-processing unit of the diagnostic device 130 accesses the manufacturing apparatus 230 relating to the urgency-information email message (S515) to acquire the operation data (S520).

The diagnostic device 130 is provided with judgment criteria that are the same as those provided to the data accumulator 220 for diagnosing abnormalities, and diagnoses the operation data acquired from the manufacturing apparatus 230 to confirm the content of the abnormality (S525). Next, the diagnostic device 130 determines whether the confirmed abnormality can be eliminated by the means that the diagnostic device 130 itself is provided with (S530). If abnormalities of data relating to data objects that are deemed more important than other data objects are judged to be eliminated by sending to the manufacturing apparatus remedy-related information such as a correction program or specific reset signals, the diagnostic device 130 stores such remedy-related information as remedy means according to the manufacturing apparatuses and the data objects relating to the abnormalities. If the diagnostic device 130 confirms that there is an abnormality, it searches for a remedy means corresponding to the confirmed abnormality. If it finds a corresponding remedy means, it sends to the manufacturing apparatus 230 the remedy-related information to remedy the abnormality (S535).

After the diagnostic device 130 sends the remedy-related information in S540, it acquires the operation data from the manufacturing apparatus 230, confirms that the previously confirmed abnormality has been eliminated due to the measures in S535, and that the operating status of the manufacturing apparatus 230 is back to normal. When the operating status of the manufacturing apparatus 230 is back to normal, the diagnostic device 130 sends to the support terminal 300 and to the user's terminal 400 a remedy-complete notification email message stating that the remedy has been automatically affected.

If the diagnostic device 130 determines that it is not possible for it to remedy the abnormality with the remedy means provided to it in S530, it sends to the support terminal 300 and to the user's terminal 400 an email message stating that remedy by the diagnostic device 130 is not possible, and that the support terminal 300 and the user's terminal 400 must cope with the abnormality.

In contrast, if the diagnostic device 130 has not received an urgency-information email message in S510, the diagnostic device 130 determines in S560 whether it is time to diagnose the operation data. If an urgency-information email message has not been sent to the diagnostic device 130, it is not necessary for the diagnostic device 130 to urgently process the operation data that has been batch-processed at the data accumulator 220, so that the diagnostic device 130 diagnoses the operation data collectively at predetermined times. The timing can be as follows: a specific interval such as once per hour or once per day is set, or when the volume of the operation data newly stored in the database of the server 120 exceeds a predetermined amount, or when the operation data that has been batch-processed at the data accumulator 220 and has been sent to the server 120 is stored in the database.

If the volume of the operation data stored in the database, or if the time of the storing of the operation data in the database is used as a trigger for performing a diagnosis, the server 120 can be configured to send a signal to the diagnostic device 130 stating that the time for diagnosing is approaching, so that the time of receiving the signal will be the time for performing diagnosis of the operation data in S560. If it is not time to diagnose the operation data in S560, the diagnostic device returns to the state where it waits for an urgency-information email message or for a signal stating the time to diagnose the operation data. If it is determined that it is time to diagnose the operation data, the diagnostic device acquires from the database of the server 120 the operation data used for the diagnosis. The operation data is to be acquired in accordance with predetermined timing for diagnosing the operation data. If the diagnosis is performed once per day, the diagnostic device acquires the operation data for one day, and if the diagnosis is performed according to a predetermined volume of the operation data to be stored in the database, the diagnostic device acquires the predetermined volume of the data.

In S565, the diagnostic device 130 diagnoses the acquired operation data. In this diagnosis, component-life-prediction information is obtained based on both the consumption information concerning each component included in the operation data, and reference information, which is the design-life information for each component. Also, the diagnostic device 130 estimates the next time for maintenance based on the symptom information included in the operation data and the threshold for the data object to be tracked, and includes the next time for maintenance in the diagnostic result. In S575, the diagnostic result is output to be stored in the database of the server 120. Thus, the diagnostic results are stored in the database such that they can be browsed via the support terminal 300 and the user's terminal 400. A maintenance person can check the next time for maintenance at any time, and the person in charge of the production line of the user factory can know the correct operating status of the manufacturing apparatus 230.

In the diagnosis of S570, if the component-life-prediction information suggests that maintenance is required earlier than the initially estimated time, or if the symptom information suggests that the next maintenance time is approaching, the maintenance person needs to know that information in order to prepare for maintenance, such as by arranging replacement components. In S580, the diagnostic device 130 determines whether maintenance will be required in the near future, and if maintenance is required, the diagnostic device 130 sends an email message to the support terminal 300 and to the user's terminal 400 in S585, including information stating that maintenance will be necessary.

Figure 6:
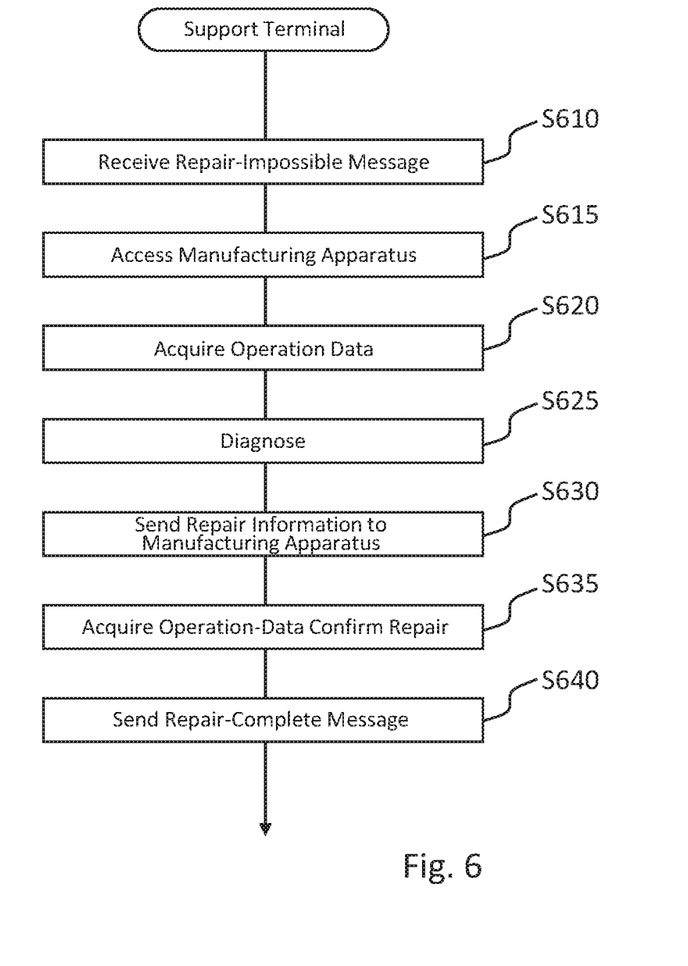
FIG. 6 is a flow chart that shows the processing of remote control by the support terminal according to an embodiment of the present invention.

FIG. 6 is a flow chart that shows the remote-control processing by the support terminal according to an embodiment of the present invention. Referring to FIG. 6, when the support terminal 300 receives an email message from the maintenance apparatus 100 in S610 stating that remedy by the diagnostic device is not possible, access to the manufacturing apparatus 230 relating to that email message is performed by the remote-control unit of the support terminal 300 (S615), so that the operation data is acquired by the remote-control unit. The operation data acquired from the manufacturing apparatus 230 is diagnosed via the support terminal 300, which determines whether there is an abnormality (S625).

Next, the information that is stored in the support terminal and that is required to remedy the manufacturing apparatus 230, or the remedy information that has been newly input from the input/output unit of the support terminal 300 is sent to the manufacturing apparatus 230. The operation data concerning the manufacturing apparatus 230 after the remedy has been performed is acquired by the support terminal 300 so as to confirm whether the remedy has been completed normally (S635). If the remedy has been completed normally, a remedy-complete notification email message is sent to the user's terminal 400.

The processing of the diagnostic device 130 of the data accumulator 220 and of the support terminal 300 shown in FIGS. 4 to 6 includes the following: If the operation data accumulated near the manufacturing apparatus 230 includes an abnormality, and it is determined that urgent remedy of the abnormality is required, an urgency-information email message is sent promptly. The email message informs the person in charge of maintenance and the person in charge of the production line of the user factory that there is an abnormality, and also requests the diagnostic device to eliminate the abnormality. If remedy by the diagnostic device is possible, the remedy is automatically affected, so that the abnormality of the production line is eliminated in a short time. If automatic remedy by the diagnostic device is not possible, that information is sent to the support terminal, whereby an advanced remedy service can be provided through the support terminal, which further increases the possibility for eliminating the abnormality. Because of the above-described processing, the online maintenance system that supports stable operation of the production line can be provided.

Also, although not shown in FIG. 5, the diagnostic device 130 can prepare a report that details how every abnormality has occurred and how it has been eliminated, or the device can prepare a report at each prescribed period, such as every month or every half-year. The report can be sent to the support terminal 300 and to the user's terminal 400, or it can be stored in the database of the server 120 so that the report can be browsed via the support terminal 300 or the user's terminal 400.

Although particular embodiments of the present invention have been shown and described with reference to the drawings, those skilled in the art will realize that changes and modifications can be made to the embodiments without departing from the invention in its broader aspects.

DESCRIPTIONS OF REFERENCE NUMERALS

1 system for online maintenance of a manufacturing apparatus
50 network
100 maintenance apparatus
110 gateway server
120 server
130 diagnostic device
200 user's production line
210 gateway
220 data accumulator
230 manufacturing apparatus
300 support terminal
400 user's terminal

The invention claimed is:

1. A system for online maintenance of a manufacturing apparatus, comprising a user's production line, a maintenance apparatus, a support terminal, and a user's terminal, each connected to each other via a network;
   said user's production line comprising a gateway, a manufacturing apparatus, and a data accumulator, the latter two being connected to the gateway;
   said maintenance apparatus comprising a gateway server, a server, and a diagnostic device, the latter two being connected to the gateway server, with the diagnostic device including a means for eliminating abnormalities;
   said data accumulator comprising a data-gathering unit for accumulating operation data concerning the manufacturing apparatus, and a data-evaluation unit for determining whether there is an urgency with regard to the accumulated data;
   said server further comprising a mail server and a database, and if the data-evaluation unit determines that the operation data includes data showing an abnormality and that there is an urgency, the data-evaluation unit sends an urgency-information email message to the mail server, and if the data-evaluation unit determines that there is no urgency with regard to the operation data, the data-evaluation unit batch-processes the operation data and sends the processed data to the server; and the mail server sends the received urgency-information email message to the diagnostic device, to the support terminal, and to the user's terminal, and the database stores the batch-processed operation data and the diagnostic results of the diagnosis performed by the diagnostic device based on the operation data;
   said diagnostic device further comprising an urgency-processing unit, and a data-diagnosis unit, wherein when the urgency-processing unit receives from the manufacturing apparatus an urgency-information email message, the urgency-processing unit acquires the operation data relating to the urgency-information email message from the manufacturing apparatus, and diagnoses the operation data; when the urgency-processing unit has confirmed that there is an abnormality in the data, the urgency-processing unit determines whether the abnormality can be eliminated, and if the urgency-processing unit determines that the abnormality can be eliminated automatically, the urgency-processing unit sends to the manufacturing apparatus the information required for eliminating the abnormality, and continues to acquire the operation data concerning the manufacturing apparatus; when the urgency-processing unit confirms that the remedy has been effected and that the operation data has returned to normal, the urgency-processing unit sends a remedy-complete notification email message to the support terminal and to the user's terminal; if the urgency-processing unit determines that the abnormality cannot be eliminated automatically, the urgency-processing unit sends to the support terminal and to the user's terminal a notification email message stating that the abnormality cannot be eliminated; and wherein the data-diagnosis unit acquires the operation data from the database of the server to diagnose the manufacturing apparatus, and outputs the diagnostic results to be stored in the database of the server.

2. The system for online maintenance of a manufacturing apparatus system according to claim 1, the support terminal further comprising a remote-control unit, with which is accessed a control unit included in the manufacturing apparatus where an abnormality is identified, control information is diagnosed remotely, and the abnormality is eliminated remotely when the support terminal unit has received a notification email message stating that the abnormality cannot automatically be eliminated.

3. The system for online maintenance of a manufacturing apparatus according to claim 1, wherein the operation data includes at least any piece of information from among (1) operating information representing the operating status of the manufacturing apparatus, (2) consumption information indicating the extent of consumption of components, (3) abnormality information indicating any abnormality of the manufacturing apparatus, and (4) symptom information indicating that the manufacturing apparatus likely will experience a problem; and
  if the operation data includes data relating to consumption information, the diagnostic device adds component-life-prediction information to the diagnostic results based on both the consumption information and reference information concerning the component relating to the consumption information.

4. A method for online maintenance of a manufacturing apparatus, said method comprising: accumulating, in a data accumulator that is connected to the user's manufacturing apparatus, operation data concerning the manufacturing apparatus;
  by the data accumulator determining, according to the content of the operation data concerning the manufacturing apparatus, whether there is an urgency with regard to the operation data concerning the manufacturing apparatus;
  by the data accumulator sending an urgency-information email message to a mail server included in a server that is included in a maintenance apparatus, if the data accumulator determines that there is an urgency with regard to the operation data;
  sending, by the mail server, the received urgency-information email message to the diagnostic device, which includes a remedy means for eliminating an abnormality, to a support terminal, and to a user's terminal;
  by the diagnostic device that has received the urgency-information email message, acquiring from the user's manufacturing apparatus the operation data relating to the urgency-information email message;
  by the diagnostic device diagnosing the operation data, and if the diagnostic device confirms that the operation data includes data showing an abnormality, by the diagnostic device determining whether the abnormality can be eliminated;
  the steps by the diagnostic device further comprising, if the diagnostic device determines that the abnormality can be automatically eliminated: (1) sending to the manufacturing apparatus the information required for eliminating the abnormality, (2) continuously acquiring operation data concerning the manufacturing apparatus, and (3) when the diagnostic device confirms that the remedy has been effected and the operation data has returned to normal, sending a remedy-complete notification email message to the support terminal and to the user's terminal; and
  if the diagnostic device determines that the abnormality cannot be eliminated automatically, by the diagnostic device sending to the support terminal and the user's terminal a notification email message stating that the abnormality cannot be eliminated; and
  if the data accumulator determines that the operation data does not contain any data showing an abnormality, and if there is no urgency with regard to the operation data, by the data accumulator batch-processing the operation data and sending the processed data to the server.

* * * * *